INTEGRATED PLUG-IN UNIT

Filed Nov. 12, 1958 6 Sheets-Sheet 1

INTEGRATED PLUG-IN UNIT

Filed Nov. 12, 1958 6 Sheets-Sheet 2

Sept. 19, 1961  R. C. STIEFEL ET AL  3,001,102

INTEGRATED PLUG-IN UNIT

Filed Nov. 12, 1958  6 Sheets-Sheet 4

Sept. 19, 1961 R. C. STIEFEL ET AL 3,001,102

INTEGRATED PLUG-IN UNIT

Filed Nov. 12, 1958 6 Sheets-Sheet 5

INVENTORS
RUDY C. STIEFEL
DMITRI A. STRAKHOV
PETER A. CARBONE

BY Borst and Borst
ATTORNEYS

United States Patent Office 3,001,102

Patented Sept. 19, 1961

3,001,102

INTEGRATED PLUG-IN UNIT

Rudy C. Stiefel, New York, Dmitri A. Strakhov, Flushing, and Peter A. Carbone, New City, N.Y., assignors to Sperry Rand Corporation, Ford Instrument Company Division, Wilmington, Del., a corporation of Delaware Filed Nov. 12, 1958, Ser. No. 773,493

8 Claims. (Cl. 317—99)

This invention relates generally to means by which a plurality of elementary electrical circuits may be electrically connected together to form a secondary circuit, and a plurality of such secondary circuits may be selectively electrically connected together to form master circuits.

The invention is especially directed to digital computers and to the means for mounting and selectively connecting together the various circuits and the electrical components incorporated therein into the desired master circuits by which a computer is actuated in accordance with the various problems imparted to the computer for solution thereby.

The invention comprises generally a multiplicity of cards on each of which is printed an elementary circuit, and on which are mounted various tubes, transistors and other electrical or electronic components which make up the circuit; a plurality of similar racks in each of which is removably mounted a plurality of said cards, and a cabinet in which said plurality of racks are removably secured. Each of the racks is provided with means by which the terminals of the elementary circuits on the cards mounted therein are electrically connected together to form a secondary circuit; and interconnecting plug-in means is provided between the cabinet and the various racks mounted therein through which the secondary circuits of the individual racks may be selectively connected together to form master circuits in accordance with the problem presented to the computer with which the mechanism is associated. Furthermore, interconnecting plug-in means is also provided by which a plurality of cabinets may be selectively serially connected together.

One of the principal objects of the invention is to simplify the creation of circuits for digital computers, and the testing, servicing and replacement of the parts thereof. This is accomplished by the use of plug-in units by which a plurality of elementary circuits are plugged into suitable receiving means to form a secondary circuit, and by which a plurality of secondary circuits are plugged into suitable receiving means by which they may be selectively connected together to form master circuits as desired.

By the apparatus of the invention the testing, servicing, and replacement of all types of units or integration of units is possible. Not only can a simple, logical circuit be plugged in and out, but the same can be done for an entire arithmetical function or an entire computer section.

Shutdown time can be minimized by having all minor, intermediate and major circuits pluggable. This is true for trouble shooting, preventive maintenance and for modifications of circuitry, and for improving the design or alteration of function; and additional racks of elementary circuits connected into secondary circuits can be supplied in order to increase the capacity of the computer. Also, in the event of any trouble in either an elementary circuit or a secondary circuit, an entire rack may be removed and a new rack having the same circuit may be quickly substituted therefor.

Furthermore, the invention provides an integrated system of multilevel plug-in components which rationalizes over-all digital computer design.

More specifically, the invention provides ease of trouble shooting, easy insertion and withdrawal of racks into and out of the cabinet, and simplified locking therein; cushioning means which provides vibration protection, and improved ventilation.

The principal objects of the invention having been stated, other and more limited objects thereof will be apparent from the following specification and the accompanying drawing forming a part thereof, in which.

Figures 10, 11, 12, 13, 15:
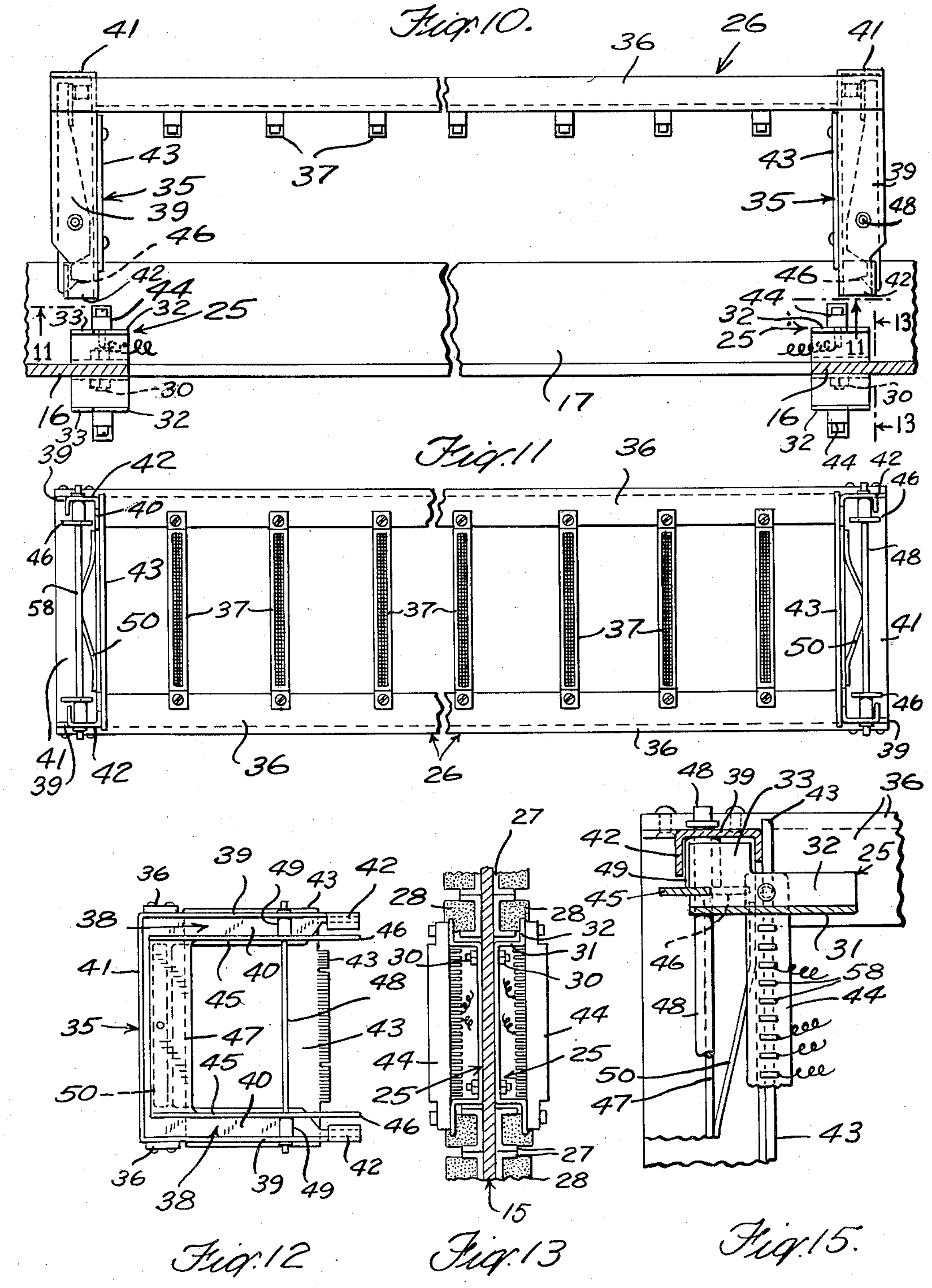
FIG. 10 is a plan view of one of the similar card holding racks showing it slightly removed from its supporting frame.
FIG. 11 is a rear elevation of the rack shown in FIG. 10 as viewed from the line 11—11 on FIG. 10.
FIG. 12 is an end elevation of the rack as viewed from the left of FIG. 10.
FIG. 13 is a fragmentary detail section taken on the line 13—13 of FIG. 10 showing the brackets by which the racks are removably mounted on the frame.
Figure 16:
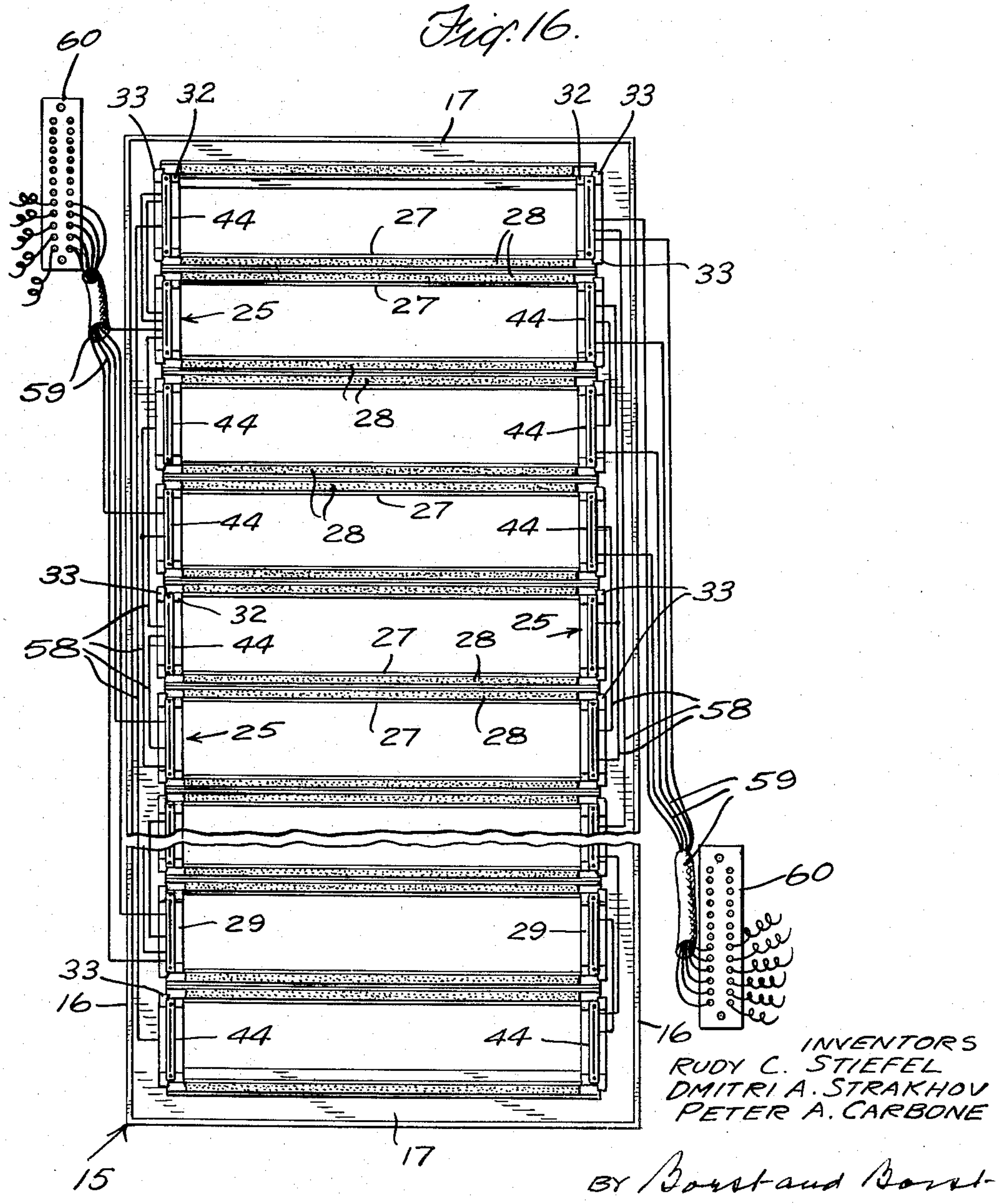

FIG. 15 is an enlarged fragmentary detail sectional view further showing the manner of mounting the racks on the frame; and FIG. 16 is a view in elevation of one of the card supporting frames removed from the cabinet showing it with all the racks removed, and diagrammatically illustrating the manner in which the various rack circuits are electrically connected together and how various cabinets are electrically connected together.

Figures 1, 2:
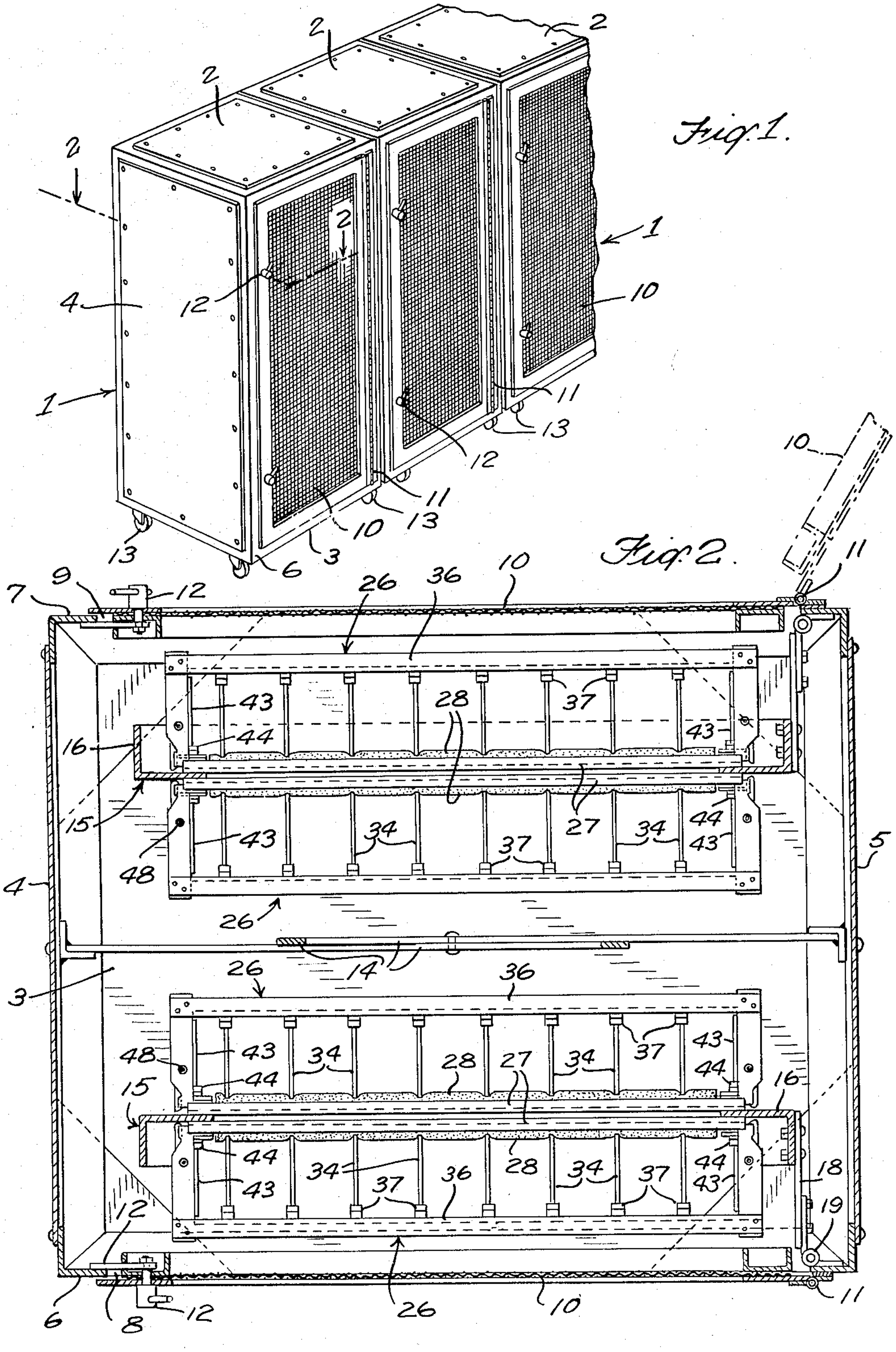
FIG. 1 is a perspective view of a bank of similar cabinets constructed in accordance with the invention.
FIG. 2 is an enlarged horizontal section through one of the cabinets shown in FIG. 1, the plane of the section being indicated by the line 2—2 on FIG. 1.

Referring now to the drawings by reference characters, the numeral 1 indicates generally a cabinet constructed in accordance with the invention. In FIG. 1, a bank of three such cabinets is shown serially connected together but otherwise one cabinet is shown and described, since these cabinets are identical in construction. The cabinet 1 is made of sheet metal and comprises the top and bottom walls 2 and 3, the side walls 4 and 5, and the front and rear walls 6 and 7. The front and rear walls 6 and 7 are provided with doorways 8 and 9 respectively, which are closed by screen doors 10 which are secured in place to the walls 6 and 7 by hinges 11 and are provided with latches 12 by which they are held in closed position. The bottom wall 3 is provided with castors 13, and medially disposed cross braces 14 are secured to and extend between the side walls 4 and 5.

Figures 3, 14:
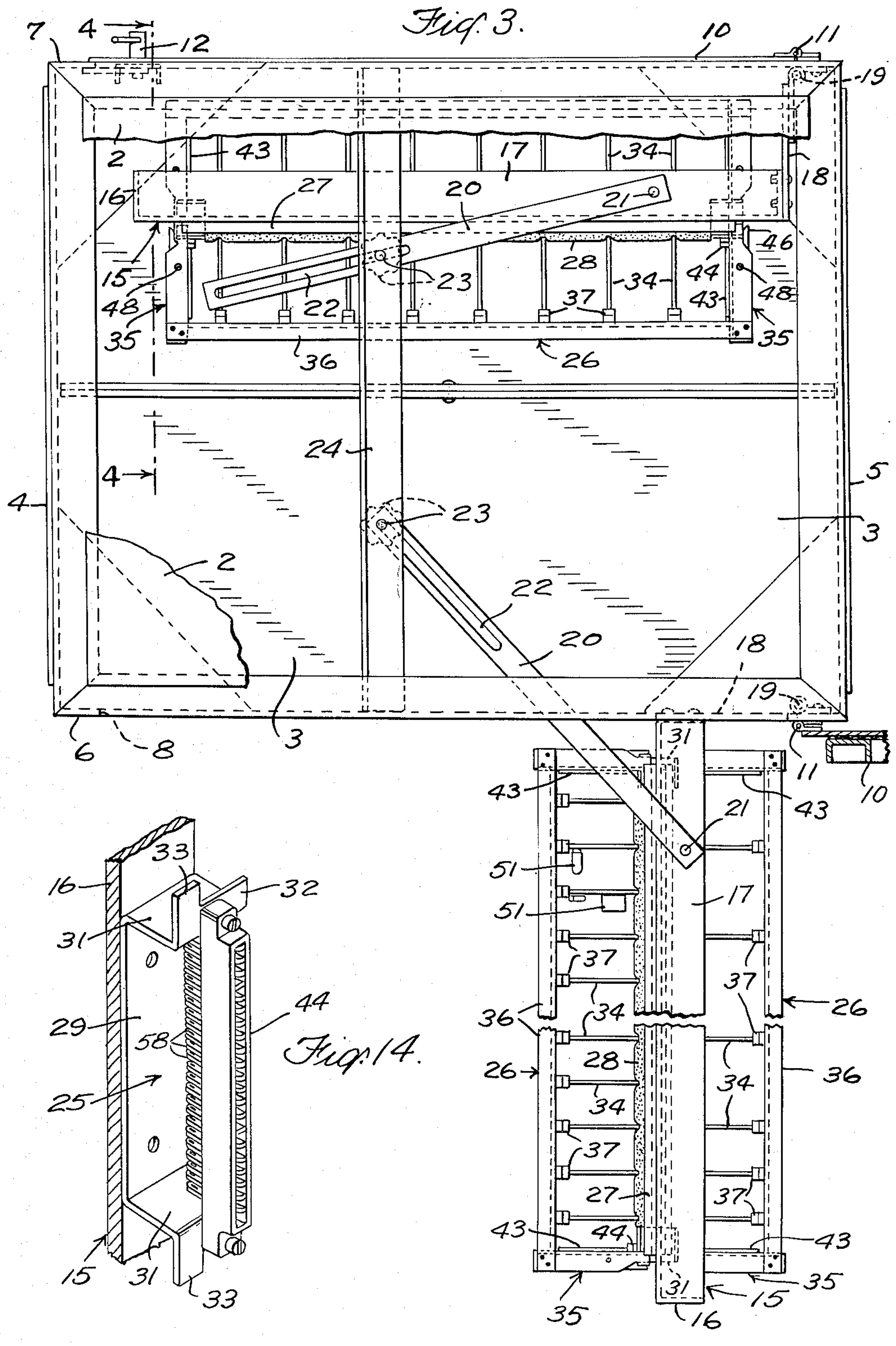
FIG. 3 is a plan view of the cabinet shown in FIG. 2 with the top broken away, and showing the front door thereof in open position and the forward rack supporting frame swung out through the open doorway.
FIG. 14 is an enlarged perspective view of one of the mounting brackets.
Figure 4:
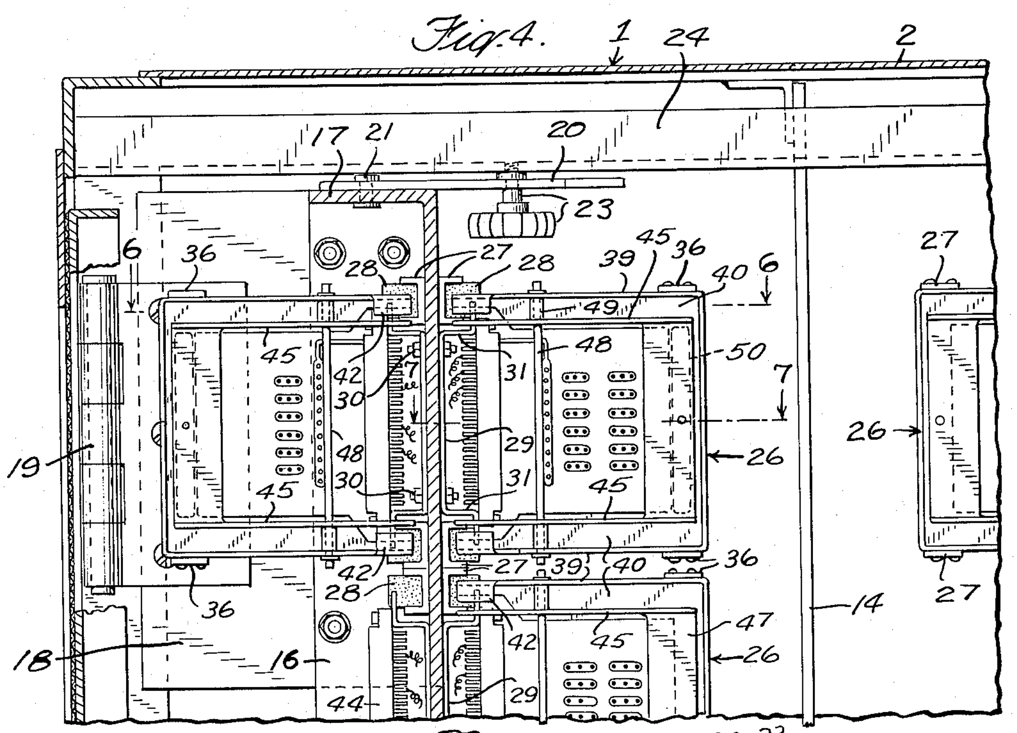
FIG. 4 is an enlarged fragmentary detail vertical section taken substantially on the line 4—4 on FIG. 3.
Figures 5, 9:
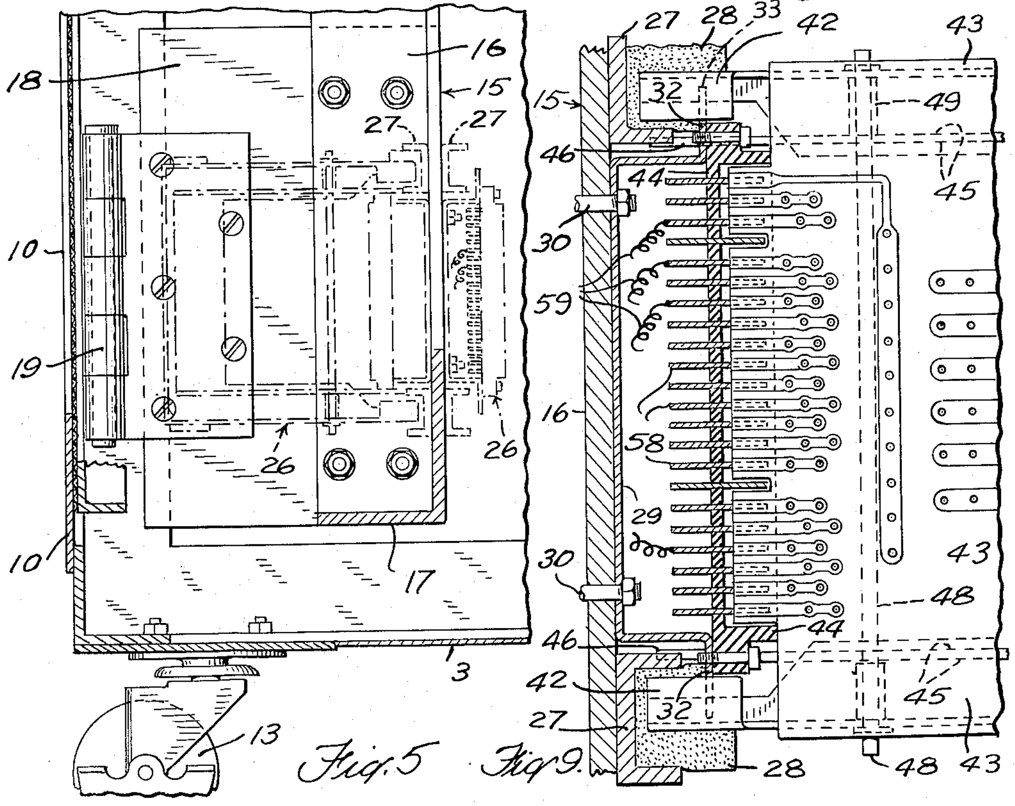
FIG. 5 is an enlarged fragmentary detail section showing the hinge mounting for the rack supporting frames by which the frames are mounted within the cabinet for swinging movement into and out of the cabinet through the doorways thereof.
FIG. 9 is a fragmentary detail vertical section taken substantially on the line 9—9 on FIG. 7.
Figures 6, 7, 8:
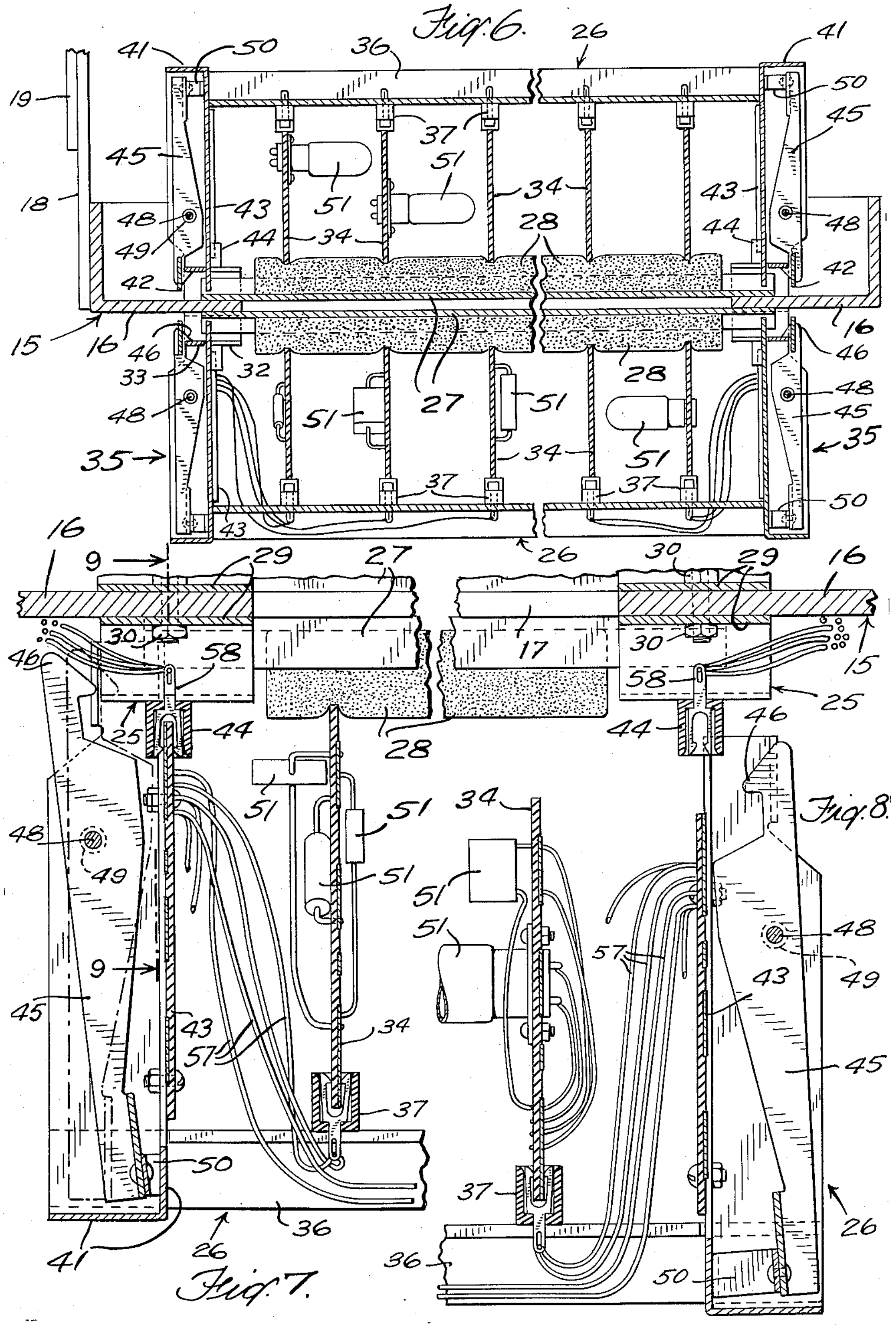
FIG. 6 is a horizontal section taken substantially on the line 6—6 of FIG. 4.
FIG. 7 is an enlarged fragmentary detail horizontal section taken through one side of a rack the plane of which is indicated by the line 7—7 on FIG. 4.
FIG. 8 is a view similar to FIG. 7, but taken through the opposite side of the rack, showing the rack being removed from the supporting frame.

A pair of similar rectangular frames 15 are hingedly mounted within the cabinet for swinging movement into and out of the cabinet through the doorways 8 and 9 when the doors 10 are in open position as indicated in FIG. 3. The frames 15 are made from angle sections and comprise the spaced parallel vertical side members 16 which are connected together at the upper and lower ends thereof by the parallel horizontally disposed cross members 17. The frames 15 are each provided with upper and lower forwardly extending plates 18, which are bolted to one of the side members 16, by which the frames are connected to hinges 19 secured to the inner faces of the front and rear walls 6 and 7 adjacent the doorways 8 and 9. The frames 15 are adapted to be held in out position, as shown in FIG. 3, by links 20 having one end thereof pivotally connected to the upper cross members 17, as indicated at 21, and being provided with elongated slots 22. Handwheel actuated shouldered clamping bolts 23, which extend up through the slots 22, are provided, by which the links 20 are clamped against movement, when the frames 15 are in out position, to a cross member 24 which is secured to and extends between the front and rear walls 6 and 7 above the doorways 8 and 9.

A plurality of similar brackets 25, by which a plurality of similar racks 26 are removably mounted on the frames 15, are secured to the front and rear faces of the side members 16 in vertical alignment in equally spaced relation to each other. Channel sections 27 having pliable rubber cushioning strips 28 therein are secured to and extend from side member to side member between adjacent brackets 25.

The brackets 25 are formed from sheet metal and each comprises an elongated base 29 by which the brackets are secured to the side members 16 of the frames 15, as by bolts 30. The upper and lower ends of the base 29 are provided with outwardly extending horizontal flanges 31. The upper flange 31 terminates in an upwardly extending vertical arm 32 having a further upwardly extending finger 33 at one side thereof; and the lower flange 31 terminates in a similar downwardly extending arm 32 and finger 33. An elongated multiple contact socket 44 is secured to and between the arms 32.

The racks 26, which are adapted to have a plurality of printed circuit cards 34 removably mounted therein, each comprises a pair of similar side frames 35 having the outer ends connected together at the top and bottom thereof by a pair of spaced parallel angle irons 36. A plurality of spaced vertically disposed similar elongated multiple contact sockets 37 are connected to and between the upper and lower angle irons 36. Each side frame 35 comprises a pair of opposed vertically spaced similar sections 38, having a horizontal wall 39 and a vertical wall 40, the outer ends of which are connected together by a right angled section 41. The inner ends of the sections 38 terminate in oppositely facing opposed channel sections 42 which are adapted to straddle the upper and lower fingers 33 of the brackets 25 when the racks 26 are mounted on the rack supporting frame 15. The vertical walls 40 of the upper and lower sections 38 are connected together by a plug-in printed circuit card 43 which is permanently secured thereto and is adapted to be inserted into one of the sockets 44 carried by the brackets 25 when the rack 26 is mounted on the frames 15, In order to retain the racks 26 in place on the frames 15 the side frames 35 thereof are each provided with a latching means which comprises a pair of spaced parallel arms 45 which are provided with hooks 46 at one end thereof and are connected together at the other ends thereof by a web 47. The arms 45 are rotatably mounted upon a pivot rod 48 which is secured to and extends between the horizontal walls 39 of the sections 38 of the frames 35. When the racks 26 are in place upon the frames 15 the hooks 46 are adapted to engage behind the arms 32 of the brackets 25, inwardly of the channel sections 42 straddling the fingers 33. Spacers 49 are provided on the rod 48 between the arms 45 and the walls 39 to maintain the arms 45 in proper position with respect to the channel sections 42. A leaf spring 50 which is secured to the web 47 is provided to yieldingly bias the hooks 46 into latching engagement with the arms 32 of the brackets 25.

The printed circuit cards 34, which are adapted to be removably secured in the racks 26, are of standard well-known construction and are adapted to have various electronic elements 51 such as tubes, transistors and the like mounted thereon, and which are electrically connected together by electric circuits printed on the cards. These cards are removably secured in the sockets 37, carried by the racks 26, with the circuits printed thereon in engagement with the contacts 55 of the sockets 37. When the racks 26 are mounted on the frames 15 the inner ends of the cards 34 engage the rubber cushioning strips 28 which resiliently hold the inner ends of the cards 34 in place. The elementary circuits printed on the cards 34 are all electrically connected together by suitably connected conductors between the sockets 37 to form secondary circuits which are connected by conductors 57 to the permanently secured printed circuit cards 43 carried by the side frames 35 of the racks 26. The sockets 44, into which the cards are inserted with the circuits thereon engaged by the contacts 58 thereof, are all electrically connected together by conductors 58 into master circuits which are connected by conductors 59 to terminal blocks 60 by which the master circuits of one cabinet are serially connected to the master circuits of other cabinets, as is diagrammatically shown in FIG. 16.

From the foregoing it will be apparent to those skilled in this art that we have provided a relatively simple and efficient means for accomplishing the objects of the invention.

It is to be understood that we are not limited to the specific construction shown and described herein, as various modifications may be made therein within the spirit of the invention and the scope of the appended claims.

What is claimed is:

1. An apparatus of the character described comprising a rectangular cabinet, a doorway in a wall of said cabinet, a rectangular rack supporting frame having a pair of spaced parallel vertical side members normally disposed in said cabinet behind said doorway, hinge means within said cabinet by which said frame is mounted for swinging movement into and out of said cabinet through said doorway, a plurality of aligned vertically spaced similar brackets secured to each side member of said frame, a plurality of multiple contact sockets one of which is secured to each of said brackets, a plurality of elongated narrow supporting members secured to and extending from side member to side member between adjacent brackets, cushioning strips of pliable rubber secured to each of said supporting members, a plurality of racks each having means by which a plurality of printed circuit cards are removably mounted in said racks, interengaging means between said racks and said brackets by which said racks are removably mounted on said rectangular frame, latching means carried by said racks by which said racks are releasably secured on said frame, plug-in circuit cards permanently secured to said racks in position to be received in said multiple contact sockets when said racks are mounted on said frame, means by which the circuits on said removable printed circuit cards are electrically connected to said permanently secured plug-in circuit cards, and means by which said multiple contact sockets are electrically connected together.

2. An apparatus as defined in claim 1 in which said cabinet is provided with a second doorway opposite said doorway, and a second card supporting frame similar to said card supporting frame which is hingedly mounted in said cabinet for swinging movement into and out of said cabinet through said second doorway.

3. An apparatus as defined in claim 2 in which said brackets with said multiple contact sockets thereon, and said supporting members having the said cushioning strips secured thereto, are similarly secured to both the inner and outer faces of the side members of said frames.

4. An apparatus as defined in claim 1 in which said brackets with said multiple contact sockets thereon, and said supporting members having the said cushioning strips secured thereto, are similarly secured to both the inner and outer faces of the side members of said frames.

5. An apparatus of the character described comprising a rectangular cabinet, a doorway in a wall of said cabinet, a rectangular rack supporting frame having a pair of spaced parallel vertical side members normally disposed in said cabinet behind said doorway, hinge means within said cabinet by which said frame is mounted for swinging movement into and out of said cabinet through said doorway, a plurality of aligned vertically spaced similar brackets secured to each side member of said frame, a plurality of multiple contact sockets one of which is secured to each of said brackets, a plurality of elongated narrow supporting members secured to and extending from side member to side member between adjacent brackets, a plurality of racks each having means by which a plurality of printed circuit cards are removably mounted in said racks, interengaging means between said racks and said brackets by which said racks are removably mounted on said rectangular frame, latching means carried by said racks by which said racks are releasably secured on said frame, plug-in circuit cards permanently secured to said racks in position to be received in said multiple contact sockets when said racks are mounted on said frame, means by which the circuits on said removable printed circuit cards are electrically connected to said permanently secured plug-in circuit cards, and means by which said multiple contact sockets are electrically connected together.

6. An apparatus as defined in claim 5 in which said cabinet is provided with a second doorway opposite said doorway, and a second card supporting frame similar to said card supporting frame which is hingedly mounted in said cabinet for swinging movement into and out of said cabinet through said second doorway.

7. An apparatus as defined in claim 6 in which said brackets with said multiple contact sockets thereon, and said supporting members are similarly secured to both the inner and outer faces of the side members of said frames.

8. An apparatus as defined in claim 5 in which said brackets with said multiple contact sockets thereon, and said supporting members are similarly secured to both the inner and outer faces of the side members of said frames.

References Cited in the file of this patent

UNITED STATES PATENTS

| | | |
|---|---|---|
| 2,645,743 | Smidt | July 14, 1953 |
| 2,688,716 | Eging | Sept. 7, 1954 |
| 2,832,013 | Pedersen | Apr. 22, 1958 |
| 2,855,454 | Alden | Oct. 7, 1958 |
| 2,894,077 | McCoy | July 7, 1959 |
| 2,895,087 | Lieb | July 14, 1959 |

FOREIGN PATENTS

| | | |
|---|---|---|
| 700,517 | Great Britain | Dec. 2, 1953 |